(12) United States Patent
Zanzig et al.

(10) Patent No.: US 7,011,125 B2
(45) Date of Patent: Mar. 14, 2006

(54) TIRE WITH RUBBER SIDEWALL CONTAINING INTERNAL ELECTRICALLY CONDUCTIVE RUBBER STRIP

(75) Inventors: David John Zanzig, Bertrange (LU); Jennifer Lyn Ryba, Wadsworth, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 0 days.

(21) Appl. No.: 10/982,294

(22) Filed: Nov. 5, 2004

(65) Prior Publication Data

US 2005/0103412 A1    May 19, 2005

Related U.S. Application Data

(60) Provisional application No. 60/523,277, filed on Nov. 18, 2003.

(51) Int. Cl.
*B60C 19/08* (2006.01)
*B60C 1/00* (2006.01)
*B60C 13/00* (2006.01)

(52) U.S. Cl. .............................. 152/152.1; 152/DIG. 2
(58) Field of Classification Search ............. 152/152.1, 152/DIG. 2
See application file for complete search history.

(56) References Cited

U.S. PATENT DOCUMENTS

| | | | |
|---|---|---|---|
| 2,329,332 A * | 9/1943 | Bull et al. | ................ 152/152.1 |
| 2,339,546 A | 1/1944 | Hanson | |
| 2,342,576 A | 2/1944 | Fielding | |
| 2,641,294 A | 6/1953 | Bridgefield | |
| 5,173,135 A | 12/1992 | Tokieda et al. | |
| 6,127,468 A | 10/2000 | Cruse et al. | |
| 6,204,339 B1 | 3/2001 | Waldman et al. | |
| 6,414,061 B1 | 7/2002 | Cruse et al. | |
| 6,528,673 B1 | 3/2003 | Cruse et al. | |
| 6,608,125 B1 | 8/2003 | Cruse et al. | |
| 2005/0087275 A1 * | 4/2005 | Zanzig et al. | ............. 152/152.1 |

FOREIGN PATENT DOCUMENTS

| | | |
|---|---|---|
| GB | 544757 | 4/1942 |
| GB | 551657 | 3/1943 |
| JP | 5247202 | 9/1993 |

OTHER PUBLICATIONS

Patent Abstracts of Japan; Publication No. 11254924; publication date Sep. 21, 1999.
European Search Report.

* cited by examiner

*Primary Examiner*—Adrienne C. Johnstone
(74) *Attorney, Agent, or Firm*—Henry C. Young, Jr.

(57) ABSTRACT

A pneumatic rubber tire with a sidewall having an outer visible layer of a rubber composition of a relatively high electrical conductivity, wherein the tire sidewall contains an internal rubber strip of relatively high electrical conductivity. Said internal rubber strip extends radially outward from a rubber chafer component of the tire to a tread base layer component of a rubber tire tread of a cap/base configuration, wherein said chafer and tread base rubber compositions are of a relatively high electrical conductivity. The rubber strip thereby provides a path of increased electrical conductivity relative to said outer visible layer of the tire sidewall extending from the tire chafer to the tread base layer tire components.

20 Claims, 2 Drawing Sheets

TIRE WITH RUBBER SIDEWALL CONTAINING INTERNAL ELECTRICALLY CONDUCTIVE RUBBER STRIP

The Applicants hereby claim priority to and incorporate by reference prior U.S. Provisional Application Serial No. 60/523,277, filed on Nov. 18, 2003.

FIELD OF THE INVENTION

A pneumatic rubber tire with a sidewall having at least one internal rubber strip of a low hysteretic, relatively high electrical conductivity rubber composition, which extends from a tire bead portion radially outward to a tire tread portion wherein said rubber strip is exclusive of an outer surface of the tire. In practice, said rubber strip is intended to provide a path of least electrical resistance between said tire bead portion and said tire tread portion. It is believed that such internal rubber strip inclusion within a tire sidewall is a novel tire component and a departure from past practice.

BACKGROUND OF THE INVENTION

It is sometimes desired to provide a tire with a combination of reduced rolling resistance, and therefore improved fuel economy for an associated vehicle, as well as reduced heat buildup, and therefore improved heat durability for the tire itself.

To promote such desirable properties of a tire, it is sometimes desired to reduce the hysteretic nature of various tire rubber components.

Such reduction in hysteresis (e.g. reduction in rubber physical rebound property) of various rubber compositions for tire components may be accomplished, for example, by reducing their carbon black contents.

However, significant reduction in carbon black content of rubber compositions of components in the sidewall region of a tire, whether by simple carbon black reduction or by replacing a significant portion of carbon black reinforcement with silica reinforcement, promotes an increased electrical resistance, or reduced electrical conductivity, of a respective tire component which may significantly increase electrical resistance to passage of static electricity between a tire's bead region and running surface of its tread, particularly as the carbon black content of a rubber composition falls below what as known as a percolation point.

For this invention, a thin rubber strip, or plurality of thin rubber strips, is envisioned which itself (themselves) are of a relatively low hysteretic property (e.g. of a high rubber physical rebound property) and therefore desirably of a low carbon content, yet also have a relatively high electrical conductivity, to promote a path of least electrical resistance between a tire's bead portion and a tire's tread portion, all within a tire sidewall and exclusive of the tire's outer surface.

In practice, a pneumatic tire is desired which has a maximum electrical resistance of 100 megohms ($1 \times 10^6$ ohms) between its rubber mounting surface in its bead portion for mounting on a rigid metal wheel rim and its rubber tread running surface (ASTM F1971-99). It can be readily appreciated that if a component of the tire positioned between its bead portion and its tread running surface is not sufficiently electrically conductive, the tire might have an electrical resistance in excess of the aforesaid desired maximum electrical resistance of 100 megaohms. It is appreciated that electricity conventionally follows a path of least electrical resistance. Accordingly, the electrical resistance for the tire between its radially inward bead portion and its radially outward tread running surface can only be as low as the electrical resistance of the electrical path between the tire bead portion and tread running surface. Moreover, insofar as a rubber tire is concerned, it is believed that electricity tends to flow primarily on or within the outer (e.g. visible) surface of the rubber tire. Therefore, for example, if a tire's outer sidewall rubber surface positioned between a radially inward electrically conductive bead component and a radially outward tread running surface has a relatively low electrical conductivity (e.g. an electrical resistance greater than 100 megaohms), then it may desired to provide a means of improving, or otherwise providing, a path of electrical conductivity between the tire bead and tread base layer of a tread of cap/base construction.

Accordingly, it is desired for this invention to provide a tire having an outer, visible tire sidewall layer of a rubber composition having a relatively low carbon black content and an associated relatively low electrical conductivity (relatively high volume electrical resistivity property for the rubber composition itself), because of its relatively low carbon black content, in order to promote a relatively higher 100° C. rebound physical property for the visible tire sidewall rubber composition (because of the reduced carbon black reinforcement) as compared to such a rubber composition with a significantly higher carbon black reinforcement content. In practice, such relatively low electrical conductivity for the rubber composition itself might be represented, for example, by a relatively high electrical volume electrical resistivity according to ASTM D 257-98 of at least $1.0 \times 10^8$ and particularly at least $1.0 \times 10^{10}$ ohm-cm which can be presented as 1.0E8 and 1.0E10 ohm-cm, respectively.

In one aspect of the invention, in order to provide a path of increased electrical conductivity, and consequently a path of least electrical resistance, for the tire sidewall (to counteract the significantly low electrical conductivity of the outer sidewall layer), a strip of a rubber composition having a contrastingly relatively high electrical conductivity (a relatively low electrical volume resistivity) is provided as a new tire sidewall component, and as a departure from past practice, which extends internally within the tire sidewall (and therefore axially inward from the outer tire sidewall layer) from a carbon black-rich rubber chafer component in the tire bead region radially outward to a carbon black-rich rubber tread base of a rubber tread of a cap/base construction, wherein both of the chafer and tread base rubber compositions have a relatively high electrical conductivity (relatively low electrical volume resistivity) because of their relatively high carbon black reinforcement contents.

Historically, the providing of one or more strips or layers of an electrically conductive material, such as for example, a rubber composition, within a tire construction to reduce, or eliminate, static electrical effects caused by operation of the tire was recognized at least as early as 1940.

U.S. Pat. No. 2,339,546 relates, for example, to a nonstatic tire which contains an element as an electrically conductive rubber composition of which one terminus of the element is positioned in the tire bead portion and adapted to be in electrically conducting relation with a tire rim and the element extends on the outside of the tire body and around the tire shoulder to the other terminus of the element in the face of the tire tread with a protective sidewall covering a portion of the outer surface of the element.

U.S. Pat. No. 2,342,576 relates, for example and at least in part, to providing one or more electrically conductive rubber strips beneath an electrically relatively non-conductive tread. Such strip may in a form of a circumferentially rubber strip which contains a significant electrically conductive carbon black content such as, for example, an acetylene black and/or certain channel blacks. The electrically conductive strip terminates short of the tire beads or rim-contacting portions of the tire.

U.S. Pat. No. 2,641,294 relates, for example, to a passenger radial tire of which at least a portion of the outer surface of a sidewall contains an electrically conductive carbon black and has a volume resistivity of not more than $10^4$ ohm cm.

U.S. Pat. No. 5,173,135 relates to, for example, a radial passenger tire with a sidewall having a volume resistivity of not more than $10^4$ ohm cm which it considers as being relatively electrically conductive.

British Patent Publication No. 544,757 relates to, for example, a tire having an electrically conductive path extending substantially from the bead region of the tire to the road contacting surface of the tread. The electrically conductive path is provided by an electrically conductive rubber cement applied to specific portions of the tire functions to discharge static electricity. The rubber cement contains a high acetylene black content.

Japanese Patent Publication No. 52/47202 relates to, for example, a static-dissipating rubber tire in which the tread rubber has an electroconductivity of $10^{-3}$ mho or better and a portion of the sheath rubber of the tire sidewall has an electroconductivity of $10^{-8}$ mho or better to form a static-dissipating path for static to pass from a wheel rim to the tread surface in contact with the road.

In the description of this invention, the term "phr" relates to parts by weight of an ingredient per 100 parts by weight of rubber, unless otherwise indicated.

The terms "rubber" and "elastomer" are used interchangeably unless otherwise indicated. The terms "vulcanized" and "cured" are used interchangeably unless otherwise indicated. The terms "compound" and "rubber composition" may be used interchangeably unless indicated. The term "carbon black" is used to refer to rubber reinforcing carbon blacks unless otherwise indicated. Exemplary rubber reinforcing carbon blacks may be referred to, for example, in *The Vanderbilt Rubber Handbook* (1987) on Pages 414 through 417.

DISCLOSURE AND PRACTICE OF THE INVENTION

In accordance with this invention, a pneumatic rubber tire is provided with a sidewall having:

(A) an outer sidewall layer (visible layer) of a rubber composition of a low electrical conductivity (e.g. a high volume electrical resistivity of at least about 1.0E10 ohm-cm according to ASTM D257-98), (B) a thin rubber strip of a rubber composition of a relatively high electrical conductivity (e.g. a relatively low electrical volume resistivity of less than about 1.0E6 ohm-cm according to ASTM D257-98) positioned on the inner surface of said outer sidewall layer, wherein said rubber strip is exclusive of the outer surface of said outer sidewall layer, and (C) a supporting tire carcass ply(ies) of cord reinforced rubber composition(s) which underlies said outer sidewall layer and said rubber strip, wherein (1) said rubber strip, outer sidewall layer and carcass ply(ies) individually communicate with at least one radially inwardly positioned tire component (e.g. a tire chafer component) having a tire mounting surface adapted to contact a metal wheel rim to form a tire/wheel assembly, wherein said radially inwardly positioned tire component is composed of a carbon black-rich rubber composition containing at least 50 phr of carbon black and having a relatively high electrical conductivity (e.g. having a relatively low electrical volume resistivity of less than 1.0E6), wherein said rubber strip is exclusive of the outer surface of said radially inwardly positioned tire component and wherein said rubber strip is thereby not adapted to contact said metal rim, and (2) said rubber strip extends radially outward from said radially inwardly positioned tire component to and connects (communicates) with a rubber tread base layer of a rubber tread of cap/base construction, wherein said tread cap has an outer rubber layer having an outer running surface intended to be ground-contacting and said rubber tread base layer underlies said tread cap layer and is not intended to be ground-contacting, wherein said rubber tread base layer is of a carbon black-rich rubber composition which contains at least 50 phr of carbon black and has a relatively high electrical conductivity (e.g. an electrical volume resistivity of less than 1.0E6 ohm-cm), wherein said rubber strip is exclusive of said running surface of said tread cap layer (so that said rubber strip is thereby not adapted to be ground-contacting), and (3) said rubber composition of said carcass ply(ies):
  (a) contains at least 50 phr of rubber reinforcing carbon black (and thereby is considered herein to be of a relatively electrically conductive rubber composition), or
  (b) contains from about 5 to about 25 phr of carbon black and correspondingly about 35 to about 55 phr of amorphous, preferably precipitated, silica together with a coupling agent for said silica (and therefore is considered herein to be of a relatively electrically nonconductive rubber composition);

wherein said internal rubber strip provides a path of increased electrical conductivity and thereby of least electrical resistance between said radially inwardly positioned tire component and said rubber tread base layer.

In practice, it is preferred that the internal rubber strip component of the tire sidewall is juxtapositioned to (placed in contact with) and thereby positioned radially inward of at least a portion of the outer sidewall layer.

In the practice of this invention, said outer sidewall layer rubber composition may have, for example, an electrical volume resistivity of at least about 1.0E10 and alternately at least about 1.0E8 ohm-cm, said internal rubber strip rubber composition may have, for example, an electrical volume resistivity of less than about 1.0E6 ohm-cm and said chafer and tread base layer rubber compositions may have, for example, an electrical volume resistivity of less than about 1.0E6 ohm-cm, preferably less than 1.0E6 ohm-cm, according to ASTM D 257-98.

In practice, rubber reinforcing carbon blacks typically used for tire sidewall rubber compositions, and therefore the said outer rubber sidewall layer, are usually of a somewhat larger particle size than carbon blacks conventionally used for tire tread rubber compositions. Such carbon blacks for reinforcing tire sidewall rubber compositions are, for example, those with ASTM designations of N550, N326 and N330. Rubber compositions containing these types of carcass grade rubber reinforcing carbon blacks typically require a content of at least 50 phr of the carbon black in the respective rubber composition to be sufficiently electrically conductive (e.g. an electrical volume resistivity of less than 1.0E6). Such rubber reinforcing carbon blacks are reported in *The Vanderbilt Rubber Handbook* (1978) on Pages 414 through 418.

For the purposes of this invention, it is contemplated that said outer sidewall rubber layer contains from about 25 to about 35 phr of rubber reinforcing carbon black so long as its electrical volume resistivity is at least 1.0E8 and preferably at least 1.0E10 ohm-cm.

The carbon black-rich rubber chafer component (e.g. containing, for example, about 70 to about 90 phr of carbon black) of a tire is well known to those having skill in such art as a component of a tire positioned in the bead region of an open toroidally shaped tire and intended to contact a rigid metal rim onto which the tire is mounted to form a tire/rim wheel assembly and thereby close the tire's open torroid shape from an enclosed, air containing cavity bounded by the tire and rim.

The carbon black-rich rubber tread base layer (e.g. containing, for example, about 50 to about 70 phr of carbon black) of a rubber tread of cap/base construction is well known to those having skill in such art. The tread cap rubber layer is intended to be ground-contacting, particularly an outer exposed surface of the tread cap, and the tread rubber base layer underlies the said tread cap layer and is not intended to be ground-contacting.

While the tread base layer is of a carbon black-rich rubber composition of a relatively high electrical conductivity, the outer tread cap rubber layer may be of either a carbon black-rich rubber composition of relatively high electrical conductivity (e.g. relatively low electrical volume resistivity of less than 1.0E6 ohm-cm) or a carbon black deficient (low carbon black content, for example, in a range of from zero to about 20 phr, yet, for example, of a relatively high amorphous, preferably precipitated, silica content) rubber composition of relatively low electrical conductivity (e.g. relatively high electrical volume resistivity of at least 1.0E10 ohm-cm). If the tread cap layer is of a relatively low electrical conductivity, then a means is typically provided for a path of increased electrical conductivity to extend from the carbon black-rich tread base layer to the outer surface of the tread cap layer intended to be ground contacting. Such means may be, for example, a thin rubber strip of a carbon black-rich rubber composition which contains at least 50 phr of carbon black and having a electrical volume resistivity of less than least 1.0E6 ohm-cm, positioned through, or around a portion of, the tread rubber cap layer to extend from a ground-contacting portion of the outer surface of the tread cap layer to a carbon black-rich rubber composition as said tread base layer or in contact with said tread base layer which contains at least 50 phr of carbon black and has an electrical volume resistivity of less than 1.0E6 ohm-cm.

Accordingly, in one aspect, said means may be provided, for example, by a thin rubber strip of a rubber composition which contains at least 50 phr of conventional rubber reinforcing carbon black (for example, carbon blacks with ASTM designation of N660, N550, N375, N330, N327, N324 or similar carbon blacks such as, for example, those having an Iodine value, ASTM D 1510, within a range of about 30 to about 95 g/kg and a DBP value, ASTM D2414, within a range of from about 55 to about 130 cm$^3$/100 g), or at least 25 phr, for example from about 25 to about 40 phr, of electrically conductive carbon black, or a blend of such conventional and electrically conductive carbon blacks so long as the rubber composition has an electrical volume resistivity of less than 1.0E6 ohm-cm, wherein said thin rubber strip of said means extends from said tread rubber base layer through said outer tread cap layer to the outer ground-contacting surface thereof.

Accordingly, in one aspect, said means may be provided, for example, by a thin rubber strip of a rubber composition which contains at least 50 phr of said conventional rubber reinforcing carbon black, or at least 25 phr of said electrically conductive carbon black, or blend of "conventional carbon black" with "electrically conductive carbon black" so long as the rubber composition has an electrical volume resistivity of less than 1.0E6 ohm-cm, wherein said thin rubber strip of said means extends from a rubber component of the tire of a rubber composition which contains at least 50 phr of carbon black and has an electrical volume resistivity of less than 1.0E6 ohm-cm, over at least a portion of the running surface of said outer tread cap layer and wherein said rubber component is a part of or contacts said tread rubber base layer.

In practice, as hereinbefore discussed, the rubber composition of said outer sidewall layer desirably contains about 25 to about 35 phr of carbon black and is therefore considered herein as being relatively electrically non-conductive.

In practice, the rubber composition of said tread base layer component and said radially inwardly positioned rubber component desirably contain from about 50 to about 75 phr of carbon black, so long as the rubber compositions of said outer sidewall layer, said internal rubber strip, said tread base layer and said radially inward positioned rubber component have said electrical volume resistivity values.

In practice, said rubber composition of said internal rubber strip desirably contains from about 70 to about 90 phr of conventional rubber reinforcing carbon black or from about 25 to about 40 phr of electrically conductive carbon black or combination of conventional and electrically conductive carbon blacks or blend of "conventional carbon black" with "electrically conductive carbon black", so long as the rubber composition has an electrical volume resistivity of less than 1.0E6 ohm-cm.

Representative examples of carbon blacks that are considered as being electrically conductive, and therefore suitable for the said internal rubber strip, are, for example N472 having an Iodine value of about 270 m$^2$/g, a nitrogen surface area (BET) of about 254 m$^2$/g and a DBP (dibutylphthalate) value of about 178 ml/100 g, as XC-7A™ from the Cabot Corporation; Corax XE-2™ from the Degussa Company reportedly having a BET value of about 560 m$^2$/g and a DBP value of about 400 ml/100 g; 23MM™ from the 3M Company reportedly having a BET value of about 558 m$^2$/g and a DBP value of about 300 ml/100 g; Ketjen EC600J™ and Ketjen EC300J™ from the AKZO Company reportedly having a BET value of about 1040 and about 800 m$^2$/g, respectively, and a DBP value of about 550 and about 360 ml/100 g, respectively.

Therefore, for such reportedly electrically conductive carbon blacks, it is considered herein that a BET nitrogen value may be within a range of from about 250 to about 1050 m$^2$/g and a DBP value may be within a range of from about 175 to about 560 ml/100 g.

It is understood that the DBP value may be determined by ASTM method D2414 and the BET nitrogen value may be suitable determined by a method described in the *Journal of the American Chemical Society*, Volume 60, Page 306 (1930).

It is to be appreciated that the aforesaid BET values and DBP values of the referenced electrically conductive carbon blacks differ significantly from BET and DBP values of more conventional rubber reinforcing carbon blacks.

For conventional rubber reinforcing carbon blacks may be, for example, carbon blacks listed in *The Vanderbilt Rubber Handbook*, (1978), Page 417, according their ASTM designated "N" number with associated Iodine values and DBP values. The BET values for the carbon blacks are understood to be similar to, and substantially the same as, corresponding BET values for the rubber reinforcing carbon blacks. For example, it is understood that for the N330 carbon black, both its Iodine value and BET value are about 82 ml/g. For such rubber reinforcing carbon blacks, taken from said page 417 of *The Vanderbilt Rubber Handbook*, other than said N472 carbon black, reported Iodine values range from about 20 to about 205 $m^2$/g with corresponding reported DBP values ranging from about 62 to about 150 ml/100 g.

Accordingly, it is readily seen that the recited electrically conductive carbon blacks differ significantly from more conventional rubber reinforcing carbon blacks other than said N472, insofar as BET values and DBP values are concerned, namely BET values within a range of about 250 to about 1050 versus approximately 20 to approximately 205 ml/g, (assuming BET values being substantially the same as corresponding Iodine values), and DBP values within a range of about 175 to about 560 versus about 62 to about 150 ml/100 g for more conventional rubber reinforcing carbon blacks.

In practice, the commonly employed amorphous silica for the respective rubber compositions is usually a precipitated silica, although the silica may be a pyrogenic silica, all which are well known to those having skill in such art.

The precipitated silicas are in a form of aggregates thereof which may be obtained, for example, by the acidification of a soluble silicate, e.g., sodium silicate or a co-precipitation of a silicate and an aluminate with an inclusion of a suitable electrolyte to promote formation of silica aggregates.

The BET surface area of the silica, as measured using nitrogen gas, may, for example, be in a range of about 50 to about 300, alternatively about 120 to about 200, square meters per gram. A BET method of measuring surface area is described in the *Journal of the American Chemical Society*, Volume 60, Page 304 (1930).

The silica may also have a dibutylphthalate (DBP) absorption value in a range of about 100 to about 400, and usually about 150 to about 300 $cm^3$/100g.

Various commercially available silicas may be considered for use in this invention such as, for example, only and without limitation, silicas commercially available from PPG Industries under the Hi-Sil trademark with designations 210, 243, etc; silicas available from Rhodia, with such as for example of Zeosil 1165 MP™ and Zeosil65GR™ and silicas available from Degussa AG with designations VN2™ and VN3™, 3770GR™ and from Huber such as for example Zeopol 8745™.

The silica reinforcement is conventionally used with a coupling agent which also aids in coupling the silica to the diene-based elastomer(s) by reaction of, for example, an alkoxysilane moiety contained in the coupling agent with hydroxyl groups (e.g. silanol groups) contained on the silica's surface and by interaction of another moiety of the coupling agent with the diene-based elastomer(s).

Compounds, or materials, capable of reacting with the silica and the rubber elastomer molecule in a manner to cause the silica to have a reinforcing effect on the rubber, are often generally known to those skilled in such art as coupling agents, or couplers. Such coupling agents, for example, may be premixed, or pre-reacted, with the silica particles or added to the rubber mix during the rubber/silica processing, or mixing, stage. If the coupling agent is added to the rubber mixture during a rubber mixing stage separately from the silica it is considered that the coupling agent then combines in situ within the rubber host with the silica.

In particular, as hereinbefore discussed, such coupling agents may, for example, be composed of a silane which has a constituent component, or moiety, (e.g. an alkoxysilane portion) capable of reacting with the silica (e.g. hydroxyl groups on the surface of the silica) and also a constituent component, or moiety, capable of interacting with the rubber, particularly a sulfur vulcanizable diene-based rubber which contains carbon-to-carbon double bonds, or unsaturation. In this manner, then the coupler acts as a connecting bridge between the silica and the diene-based rubber and thereby enhances the rubber reinforcement aspect of the silica and exfoliated clay platelets. Such interaction is well known to those having skill in such art.

In one aspect, the silane, particularly an alkoxysilane, of the coupling agent apparently forms a bond to the silica surface, possibly through hydrolysis, and the rubber interactive component of the coupling agent combines with the rubber itself.

Numerous coupling agents may be used, including usually those taught for use in combining silica and rubber such as, for example, silane (e.g. alkoxysilane) based coupling agents containing a polysulfide component, or structure, such as bis-(3-alkoxysilylalkyl)polysulfide which contains primarily from 2 to 6 sulfur atoms in its polysulfidic bridge with an average of from 2 to 4, alternately an average of from 2 to 2.6 or an average of from 3.5 to about 4, preferably an average of from 2 to 2.6, connecting sulfur atoms in its polysulfidic bridge such as, for example, a bis-(3-triethoxysilylpropyl)polysulfide.

Thus, a contemplated coupling agent is a bis-(3-ethoxysilylpropyl)polysulfide material having from 2 to 6, with an average, for example, of from 2 to 2.6 connecting sulfur atoms in the polysulfide bridge. Such coupling agent is often preferred, as compared to such a coupling agent having a significantly higher average of from 3 to 4 connecting sulfur atoms in its polysulfidic bridge, in order to provide enhanced ease of processing, particularly mixing, the unvulcanized rubber composition.

However, as also hereinbefore discussed, a coupling agent may be used which contains an alkoxysilane moiety for reaction with hydroxyl groups contained on the silica (e.g. silanol groups) if silica is used, and a mercapto functionality, or moiety, for interaction with the diene-based elastomer(s).

Representative of such coupling agent is, for example, an organomercapto alkoxysilane such as for example, mercaptopropyl triethoxysilane. Alternately, such coupling agents with a mercapto functionality, or moiety, may be used in which the mercapto functionality, or moiety, has been blocked by a moiety which is itself labile and in which the blocked mercapto functionality may be deblocked under the rubber vulcanization conditions of elevated temperature to provide the rubber reactive mercapto functionality. Thus an appropriate organomercapto alkoxysilane such as, for example, mercaptopropyl triethoxysilane, with its mercapto group blocked by such a moiety (organomercapto trialkylsilane, or mercaptopropyl triethoxysilane having a blocked mercapto moiety with a moiety which capable of being deblocked at an elevated temperature) may be used for which its mercapto moiety is then deblocked during vulcanization of the associated rubber composition at an elevated temperature such as, for example, a temperature in a range of from about 140° C. to about 160° C. For example, see U.S. Pat. Nos. 6,127,468, 6,204,339, 6,414,061, 6,528,673 and 6,608,125 which are incorporated herein in their entirety.

Additionally, the coupling agent may be used as an additive for in situ reaction with the hydroxyl group-containing fillers, namely the partially exfoliated, intercalated, clay particles, as well as amorphous silica if used, or as a pre-reaction modifier to such fillers, and may be comprised of an alkoxy silane or haloalkyl silane in combination with the aforesaid polysulfidic organoalkoxysilanes or organomercapto alkoxysilanes. The alkoxy silanes and haloalkyl silanes, while not coupling agents themselves, may react with the hydroxyl groups of the silica to supplement the coupling performance of the polysulfidic organosilanes or organomercaptosilanes.

Alternately, said amorphous silica may be provided as a pre-formed reaction product, prior to introduction to, or mixing with, the elastomer(s), of precipitated silica which contains hydroxyl groups on its surface and the coupling agent as a co-reactant.

In such manner and in one aspect for example, the amorphous silica may be provided as a pre-formed reaction product of precipitated silica and a co-reactant as polysulfidic organosilane as a bis(3-alkoxysilylalkyl)polysulfide, and particularly a bis(3-triethoxysilylpropyl)polysulfide, having an average of from about 2 to about 4 connecting sulfur atoms in its polysulfidic bridge.

In another aspect, the amorphous silica may be provided as a pre-formed reaction product of precipitated silica and a co-reactant as an organomercapto alkoxysilane or organomercapto alkoxysilane in which its mercapto functionality has been blocked by a moiety which is capable of being deblocked during vulcanization of the associated rubber composition at an elevated temperature such as, for example, a temperature in a range of from about 140° C. to about 160° C.

In a further aspect, the amorphous silica may be provided as a pre-formed reaction product of precipitated silica and a co-reactant as a combination of said bis(3-trialkoxysilylalkyl)polysulfide or organomercapto allkoxysilane with an alkoxysilane or haloalkyl silane.

Further, the amorphous silica may be provided as a pre-formed reaction product of a precipitated silica and a co-reactant as a combination of alkoxy silane or haloalkyl silane with an organomercapto alkoxysilane in which its mercapto functionality has been blocked by a moiety which is capable of being deblocked during vulcanization of the associated rubber composition at an elevated temperature such as, for example, a temperature in a range of from about 140° C. to about 160° C.

In practice, said alkoxy alkylsilane may, for example, be represented as the general formula (I):

$$(RO)_n—Si—R^1{}_{4-n} \qquad (I)$$

where R is selected from methyl and ethyl radicals, $R^1$ is an alkyl radical containing from one to twenty carbon atoms and n is a value of from 1 to and including 3.

In practice, said haloalkyl silane may, for example, be represented as the general formula (II):

$$(X)_n—Si—R^1{}_{4-n} \qquad (II)$$

where X is a halogen selected from chlorine or bromine and $R^1$ is an alkyl radical containing from one to twenty carbon atoms.

In practice, said organomercapto alkoxysilane may, for example, be represented as the general formula (III):

$$(RO)_3—Si—R^2—SH \qquad (III)$$

where R is selected from methyl and ethyl radicals and $R^2$ is an alkylene radical containing from one to six, preferably three, carbon atoms.

BRIEF DESCRIPTION OF THE DRAWINGS

Drawings are provided herewith as FIG. 1 and FIG. 2.

FIG. 1 is intended to be a more detailed drawing of the tire construction.

THE DRAWINGS

Figure 1:
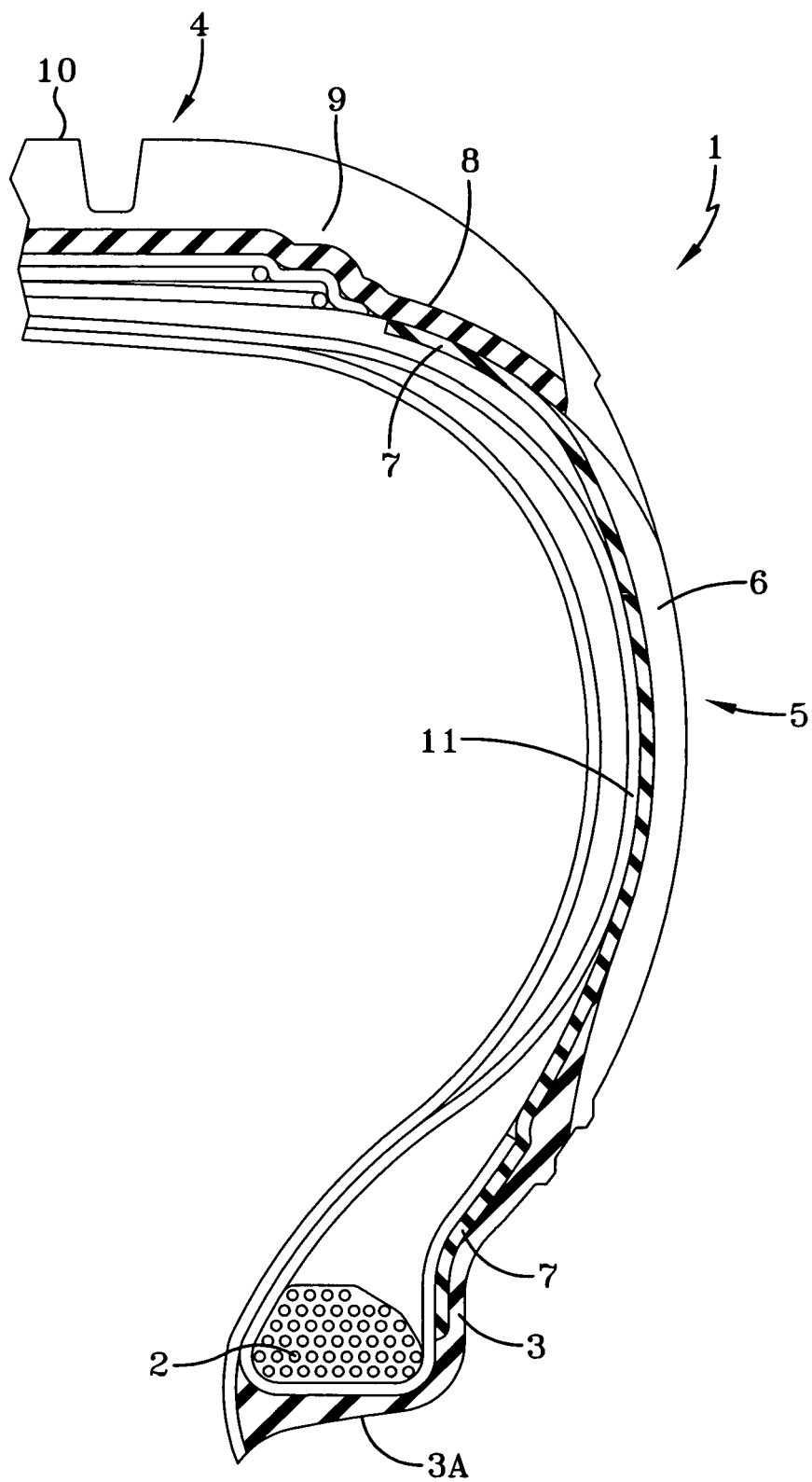
FIG. 1 depicts a cross-section of a portion of an open toroidally shaped pneumatic tire and FIG. 2 depicts a perspective view of a cross-section of the pneumatic tire.
Figure 2:
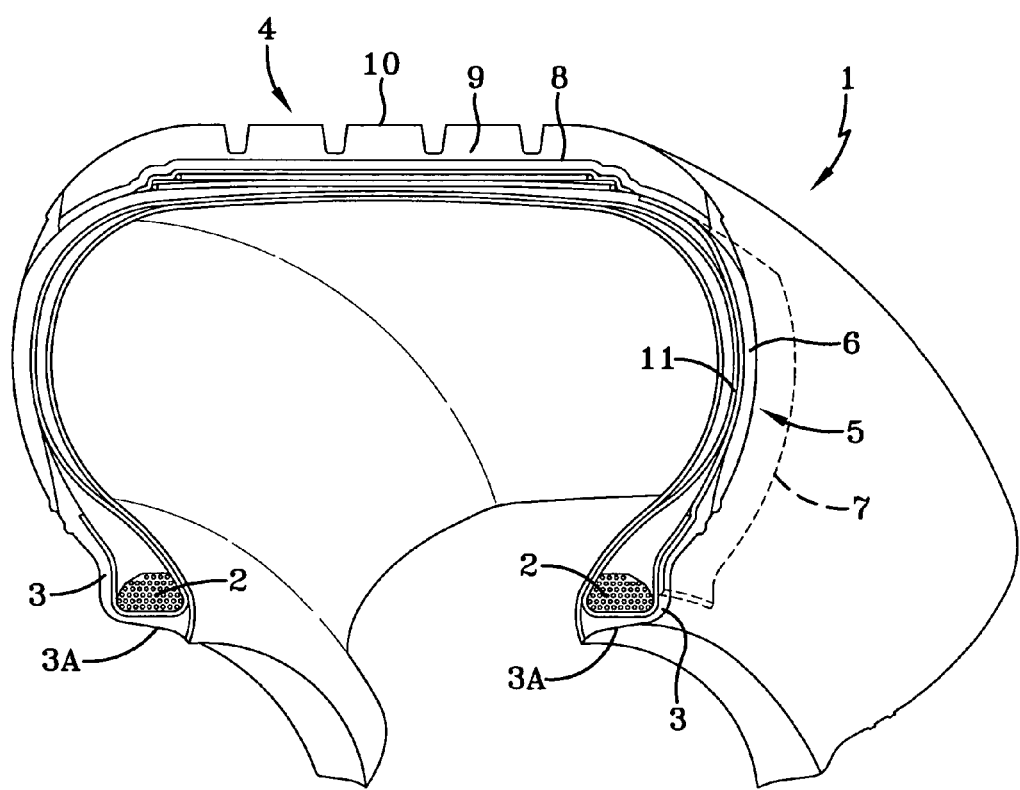

Referring to both FIG. 1 and FIG. 2, and particularly FIG. 1, cross-sections of an open toroidally shaped tire (1) are presented with two spaced apart bead components (2), a rubber chafer (3) as a part of the overall bead portion of the tire with a tire mounting surface designed to contact a rigid metal wheel rim (not shown) onto which the tire is to be mounted to form a tire/rim assembly and thereby create an enclosed, air-containing cavity, a circumferential rubber tread (4) of a cap/base construction, rubber sidewalls (5) extending radially outward from said bead (2) and chafer (3) components to and connecting with the peripheral edges of the tread (4) of the tire (1), together with one or more fabric reinforced rubber plies (11), identified in FIG. 2, extending between said bead components (2) and which supports the sidewalls (5) and ultimately the circumferential tread (4).

In the drawings, the tire sidewall (5) has an outer visible rubber layer (6) and an internal rubber strip (7) positioned within said sidewall (5) extending from the chafer component (3) to and connecting with a tread base layer (8) of said tread (4) and exclusive of the outer, exposed surface of the outer sidewall layer (6) which is juxtapositioned to at least a portion of said outer sidewall layer (6).

For the drawings, the outer sidewall layer (6) is of a rubber composition having a relatively high electrical volume resistivity of at least 1.0E10 ohm-cm and the rubber compositions of the chafer (3), including the aforesaid tire mounting surface, and the rubber tread base layer (8) have an electrical volume resistivity of less than 1.0E7 ohm-cm, preferably less than 1.0E6 ohm-cm.

The novel internal rubber strip (7) has a relatively low volume resistivity of less than 1.0E7, and more preferably less than 1.0E6, ohm-cm.

Accordingly, it is seen herein that the internal rubber strip (7) provides a path of increased electrical conductivity (reduced electrical volume resistivity) within the tire sidewall (5) between said chafer (3) of the overall bead component, particularly including the tire mounting surface, and the tire base layer (8).

The internal rubber strip (7) does not physically extend to and is therefore exclusive of and not a part of, the aforesaid tire mounting surface nor the outer visible surface (9) of the tread cap layer, or running surface (10) intended to be ground-contacting. In practice, it is also preferred that the internal rubber strip (7) does not physically extend to the tread cap layer (10).

If the tread cap layer (10) rubber composition contains only a minimal content of carbon black reinforcement, such as for example, a silica-rich rubber composition which is primarily reinforced with precipitated silica, in a manner that the tire tread cap layer (10) rubber composition has a relatively low electrical conductivity, then a means may be provided to extend the path of electrical conductivity to the ground-contacting outer surface (9) of the tread cap layer (10) such as by, for example, providing a thin extension of the electrically conductive tread base layer (8) through the tread cap layer (10) to its outer surface (9) intended to be ground-contacting or around a portion of the tread cap layer (10) via a thin carbon black-rich rubber strip of a relatively electrically conductive rubber composition extending from a tire component adjacent to said outer surface (9) of said tread cap layer (10) of a carbon black-rich rubber composition of a relatively high electrical conductivity which is a part of or is in contact with said tread base layer (8).

The tire (1) has an electrical resistance (ASTM F171-99) of less than 100 meghoms (less than 1×106 ohms) between its rubber tire mounting surface in its bead portion and its rubber tread running surface.

It is envisioned herein said the aforesaid carbon black content of said outer sidewall layer causes the outer sidewall layer to have a significantly reduced electrical conductivity relative to said tire bead, chafer and tread components. It is therefore envisioned herein that the positioning of the said rubber strip within the tire sidewall, spaced apart from the outer surface of the outer sidewall layer, provides a path of increased electrical conductivity (reduced electrical volume resistivity) between said chafer and tread belt ply and/or tread base layer components and ultimately, through associated electrically conductive rubber components, said tire mounting surface and tread running surface.

As hereinbefore pointed out, various particulate rubber reinforcing carbon blacks conventionally used for reinforcement of various tire component rubber compositions are referenced in *The Vanderbilt Rubber Handbook* (1978), Pages 414 through 417.

A significant aspect of this invention is the providing a path of increased electrical conductivity internally within tire sidewall which contains an outer layer of rubber composition of reduced electrical conductivity.

This is considered herein as being significant to provide such internal path of increased electrical conductivity between the tire chafer and tire tread base layer to aid in reducing static electricity build up within the tire.

It is readily understood by those having skill in the art that the rubber compositions of the respective components of the tire would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, resins including tackifying resins, and plasticizers, fillers, pigments, fatty acid, zinc oxide, waxes, antioxidants and antiozonants and reinforcing materials such as, for example, the hereinbefore discussed carbon black and silica. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 20 phr. Such processing aids are intended to exclude, or at least substantially exclude aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in *The Vanderbilt Rubber Handbook* (1978), Pages 344 through 346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention unless otherwise indicated.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which the primary accelerator is generally used in the larger amount (0.5 to 2 phr), and a secondary accelerator which is generally used in smaller amounts (0.05 to 0.50 phr) in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention unless otherwise indicated.

Sometimes one or more of the antioxidants and antiozonants may be more simply referred to as antidegradants.

The tire can be built, shaped, molded and cured by various methods which will be readily apparent to those having skill in such art.

The prepared tire of this invention is conventionally shaped and cured by methods known to those having skill in such art.

The following example is provided to further illustrate a portion of the invention. The parts and percentages are by weight unless otherwise indicated.

EXAMPLE I

A rubber sample, referred to herein as Sample A, is provided as a rubber composition representative of the internal rubber strip of this invention.

The various ingredients for Samples A are exemplified in the following Table 1. The ingredients were mixed in an internal rubber mixer as a first non-productive mixing step, to the exclusion of sulfur and vulcanization accelerator, for about 4.5 minutes to a temperature of about 160° C., dumped from the mixer, sheeted out from an open roll mill and allowed to cool below 40° C. and than mixed in a productive mixing step, in which sulfur, vulcanization accelerator(s) and zinc oxide are added, for about 2.2 minutes to a temperature of about 110° C. The use of separate non-productive and productive mixing steps are well known to those having skill in such art.

TABLE 1

| Material | Parts Sample A |
|---|---|
| Non-Productive Mixing (160° C.) | |
| Natural cis 1,4-polyisoprene rubber | 100 |
| Carbon black (N472)[1] | 30 |
| Naphthenic/paraffinic medium rubber processing oil | 5 |
| Microcrystalline and paraffinic waxes | 1 |
| Productive Mixing (115° C.) | |
| Sulfur | 2 |
| Accelerator, sulfenamide type | 1 |
| Antidegradant, amine type | 1 |
| Zinc oxide | 3.5 |

[1]N472, an ASTM designation, is a relatively electrically conductive carbon black reportedly having an iodine value of approximately 270 m$^2$/g, a nitrogen surface area (BET) of approximately 254 m$^2$/g and a DBP (dibutylphthalate) value of approximately 178 ml/100 g, as XC-72 ™ from the Cabot Corporation

EXAMPLE II

The prepared rubber composition (Sample A) was evaluated for its physical properties as shown in the following Table 2. The Sample A rubber composition was cured at a temperature of about 170° C. for about 11 minutes.

TABLE 2

| Properties | Sample A |
|---|---|
| Minimum torque (dNm) | 2 |
| Maximum torque (dNm) | 14.7 |
| ATS Stress Strain[1] | |
| 300% modulus (MPa) | 5.3 |
| Ultimate tensile strength (MPa) | 17.3 |
| Ultimate elongation (%) | 568 |
| Rebound (23° C.) | 62.6 |
| Rebound (100° C.) | 69.2 |
| Electrical Volume Resistivity | |
| ASTM D257-98, ohm-cm | 7.25E5 |

[1]Data obtained according to Automated Testing System instrument (referred to in the Table as "ATS") of the Instron Corporation which incorporates a number of tests in one system or instrument.

The associated rubber composition for an outer sidewall layer with reduced carbon black content, thereby resulting in a relatively low electrical conductivity as represented by a relatively high electrical volume resistivity (ASTM D2157-98) was 2.34E12. The rubber composition was comprised of natural cis 1,4-polyisoprene rubber and cis 1,4-polybutadiene rubber which contained 27.5 phr of conventional N550 carbon black.

It can be seen from Table 2 that the rubber composition of the thin rubber strip had an electrical volume resistivity reported as 7.25E5 ohm-cm as compared to a significantly higher electrical volume resistivity of the rubber composition for the associated outer rubber sidewall layer of 2.34E12 which is a significant difference of about seven orders of magnitude.

Therefore, it is considered herein that a strip of the rubber composition of Sample A, for example a strip having a thickness of about 0.025 inches (about 0.064 cm) and width of about 2.5 cm can provide an internal path of increased electrical conductivity within a tire sidewall having an outer layer of relatively low electrical conductivity where both the internal rubber strip and the outer sidewall layer extend from a tire chafer radially outward to a tire tread base layer of a tread of cap/base construction and where both of said chafer and tread base rubber compositions have a relatively high electrical conductivity relative to said outer sidewall layer.

Pneumatic rubber tires were prepared using such a relatively electrically conductive rubber strip positioned in the tire sidewall inside of the relatively electrically nonconductive outer sidewall rubber layer and between a tire mounting surface of an electrically conductive tire component in the bead portion of the tire and a relatively electrically conductive rubber of a belt ply underlying the tire tread, as illustrated in FIG. 1. The tire was tested for electrical resistance (ASTM F1971-99) between its mounting surface and its tread running surface as being significantly less than the desirable maximum of 100 megohm electrical resistance.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire with a sidewall having an outer visible layer of a rubber composition of low electrical conductivity; wherein said tire sidewall contains an internal rubber strip of a rubber composition of relatively high electrical conductivity; wherein said rubber strip is exclusive of the outer surface of said outer visible sidewall layer, wherein (A) said rubber strip and said outer sidewall layer individually communicate with at least one radially inwardly positioned tire component adapted to contact a metal rim to form a tire/wheel assembly, wherein said at least one radially inwardly positioned tire component is composed of a carbon black-rich rubber composition containing at least 50 phr of carbon black and having a relatively high electrical conductivity, wherein said rubber strip is exclusive of the outer surface of said at least one radially inwardly positioned tire component and wherein said rubber strip is thereby not adapted to contact said metal rim, and (B) said rubber strip extends radially outward from said at least one radially inwardly positioned tire component within said tire sidewall to and connects with a rubber tread base layer of a rubber tread of cap/base construction, wherein said tread cap is an outer rubber layer having an outer surface adapted to be ground-contacting and said rubber tread base layer underlies said tread cap layer and is not intended to be ground-contacting, wherein said rubber tread base layer is of a carbon black-rich rubber composition which contains at least 50 phr of carbon black and has a relatively high electrical conductivity, wherein said rubber strip is exclusive of the outer surface of said tread cap layer adapted to be ground-contacting and wherein said rubber strip is thereby not adapted to be ground-contacting;

wherein said rubber composition of said internal rubber strip provides a path of increased electrical conductivity and thereby of least electrical resistance between said at least one radially inwardly positioned tire component and said tread rubber base layer.

2. The tire of claim 1 wherein said outer sidewall layer has an electrical volume resistivity of at least $1.0 \times 10^{10}$ ohm-cm; wherein said internal rubber strip, said tread base rubber layer and said at least one radially inwardly positioned tire component have an electrical volume resistivity of less than $1.0 \times 10^6$ ohm-cm.

3. The tire of claim 2 wherein said at least one radially inwardly positioned tire component is a relatively electrically conductive rubber tire chafer.

4. The tire of claim 2 wherein the rubber composition of said outer sidewall layer contains from about 25 to about 35 phr of carbon black, said rubber composition of said internal rubber strip contains from about 70 to about 90 phr of carbon black or from about 25 to about 40 phr of electrically conductive carbon black of conventional rubber reinforcing carbon black and electrically conductive carbon black and the rubber composition of said tread base layer component and said at least one radially inwardly positioned rubber tire component; contain from about 50 to about 75 phr of carbon black.

5. The tire of claim 2 wherein the tread outer cap layer of said tire tread is of a carbon black-rich rubber composition of a relatively high electrical conductivity.

6. The tire of claim 2 wherein said outer tread cap layer is of a rubber composition which has a minimal carbon black content in a range of from zero to about 20 phr and has a low electrical conductivity having a relatively high electrical volume electrical resistivity of greater than about $1.0 \times 10^{10}$ ohm-cm, wherein a means is provided for a path of increased electrical conductivity to extend from said carbon black-rich tread base layer to the outer surface of the tread cap layer intended to be ground contacting.

7. The tire of claim 6 wherein said means is provided by a thin rubber strip of a rubber composition which contains at least 50 phr of carbon black and has an electrical volume resistivity of less than $1.0 \times 10^6$ ohm-cm, wherein said thin rubber strip of said means extends from a rubber component of the tire of a rubber composition which contains at least 50 phr of carbon black and has an electrical volume resistivity of less than $1.0 \times 10^6$ ohm-cm, over at least a portion of the running surface of said outer tread cap layer and wherein said rubber component is a part of or contacts said tread rubber base layer.

8. The tire of claim 1 wherein said internal rubber strip is positioned within said sidewall and juxtapositioned to at least a portion of said outer sadewall layer.

9. The tire of claim 8 wherein the tread outer cap layer of said tire tread is of a carbon black-rich rubber composition of a relatively high electrical conductivity.

10. The tire of claim 1 wherein said at least one radially inwardly positioned tire component is a relatively electrically conductive rubber tire chafer.

11. The tire of claim 10 wherein the tread outer cap layer of said tire tread is of a carbon black-rich rubber composition of a relatively high electrical conductivity.

12. The tire of claim 1 wherein the rubber composition of said outer sidewall layer contains carbon black from about 25 to about 35 phr, said rubber composition of said internal rubber strip contains from about 70 to about 90 phr of conventional rubber reinforcing carbon black or from about 25 to about 40 phr of electrically conductive carbon black of conventional rubber reinforcing carbon black and electrically conductive carbon black and the rubber composition of said tread base layer component contains from about 50 to about 75 phr of carbon black.

13. The tire of claim 1 wherein the tread outer cap layer of said tire outter cap layer of said tire tread is of a carbon black-rich rubber composition of a relatively high electrical conductivity.

14. The tire of claim 1 wherein the tread outer cap layer of said tire tread is of a carbon black-rich rubber composition of a relatively high electrical conductivity having a relatively low electrical volume resistivity of less than $1.0 \times 10^6$ ohm-cm.

15. The tire of claim 1 wherein said outer tread cap layer is of a rubber composition which has a minimal carbon black content and has a low electrical conductivity, wherein a means is provided for a path of increased electrical conductivity to extend from said carbon black-rich tread base layer to the outer surface of the tread cap layer intended to be ground contacting.

16. The tire of claim 15 wherein said means is provided by a thin rubber strip of a rubber composition which contains at least 50 phr of carbon black and has an electrical volume resistivity of less than $1.0 \times 10^6$ ohm-cm, wherein said thin rubber strip of said means extends from said tread rubber base layer through said outer tread cap layer to the outer ground-contacting surface thereof.

17. The tire of claim 15 wherein said means is provided by a thin rubber strip of a rubber composition which contains at least 50 phr of carbon black and has an electrical volume resistivity of less than $1.0 \times 10^6$ ohm-cm, wherein said thin rubber strip of said means extends from a rubber component of the tire of a rubber composition which contains at least 50 phr of carbon black and has an electrical volume resistivity of less than $1.0 \times 10^6$ ohm-cm, over at least a portion of the running surface of said outer tread cap layer and wherein said rubber component is a part of or contacts said tread rubber base layer.

18. The tire of claim 1 wherein said outer tread cap layer is of a rubber composition which has a minimal carbon black content in a range of from zero to about 20 phr and has a low electrical conductivity as represented by a relatively high electrical volume electrical resistivity of greater than about $1.0 \times 10^{10}$ ohm-cm, wherein a means is provided for a path of increased electrical conductivity to extend from said carbon black-rich tread base layer to the outer surface of the tread cap layer intended to be ground contacting.

19. The tire of claim 18 wherein said means is provided by a thin rubber strip of a rubber composition which contains at least 50 phr of carbon black and has an electrical volume resistivity of less than $1.0 \times 10^6$ ohm-cm, wherein said thin rubber strip of said means extends from said tread rubber base layer through said outer tread cap layer to the outer ground-contacting surface thereof.

20. The tire of claim 1 wherein said internal rubber strip is comprised of natural cis 1,4-polyisoprene rubber and 25 to 40 phr of electrically conductive carbon black having a DBP value in a range of from about 175 to about 560 ml/100 g and a BET nitrogen surface area value in a range of about 250 to about 1050 $m^2/g$.

* * * * *